United States Patent
Kuroda et al.

(10) Patent No.: US 8,113,894 B2
(45) Date of Patent: Feb. 14, 2012

(54) OUTBOARD ENGINE UNIT

(75) Inventors: Tatsuya Kuroda, Wako (JP); Kazuyoshi Sato, Wako (JP); Hiroki Tawa, Wako (JP); So Tanaka, Wako (JP); Hideaki Takada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 106 days.

(21) Appl. No.: 12/773,553

(22) Filed: May 4, 2010

(65) Prior Publication Data

US 2010/0285707 A1 Nov. 11, 2010

(30) Foreign Application Priority Data

May 7, 2009 (JP) ................ P2009-113061

(51) Int. Cl.
*F01N 13/08* (2010.01)
(52) U.S. Cl. .................................... 440/89 R
(58) Field of Classification Search ............ 440/89 R, 440/89 F, 89 E; 123/195 P
See application file for complete search history.

(56) References Cited

U.S. PATENT DOCUMENTS 4,303,401 A * 12/1981 Sanmi et al. ............ 440/88 R
6,119,453 A * 9/2000 Motose et al. ............ 60/285

FOREIGN PATENT DOCUMENTS

JP 05-246389 A 9/1993

\* cited by examiner

*Primary Examiner* — Edwin Swinehart
(74) *Attorney, Agent, or Firm* — Arent Fox LLP

(57) ABSTRACT

Exhaust passage system in an outboard engine unit includes: an engine-side exhaust pipe; a downstream exhaust pipe for directing exhaust gas downstream from the engine-side exhaust pipe, a lower end portion of the engine-side exhaust pipe and an upper end portion of the downstream exhaust pipe being positioned in horizontally parallel to each other and horizontally overlap each other so as to provide fluid communication therebetween via a through-hole formed in the overlapping portions of the end portions; and a vertical partition wall provided, in an upper end region of the overlapping portions for hampering back-flows of fluid.

3 Claims, 7 Drawing Sheets

FIG.5A (COMP.EX.)

FIG.5B (EMBODIMENT)

OUTBOARD ENGINE UNIT

FIELD OF THE INVENTION

The present invention relates to outboard engine units having an exhaust passage system incorporated therein for discharging exhaust gas from an engine.

BACKGROUND OF THE INVENTION

Outboard engine units have an exhaust passage system for discharging exhaust gas from an engine, one example of which is disclosed in Japanese Patent Application Laid-Open Publication No. HEI-05-246389(JP H05-246389 A).

Figure 7:
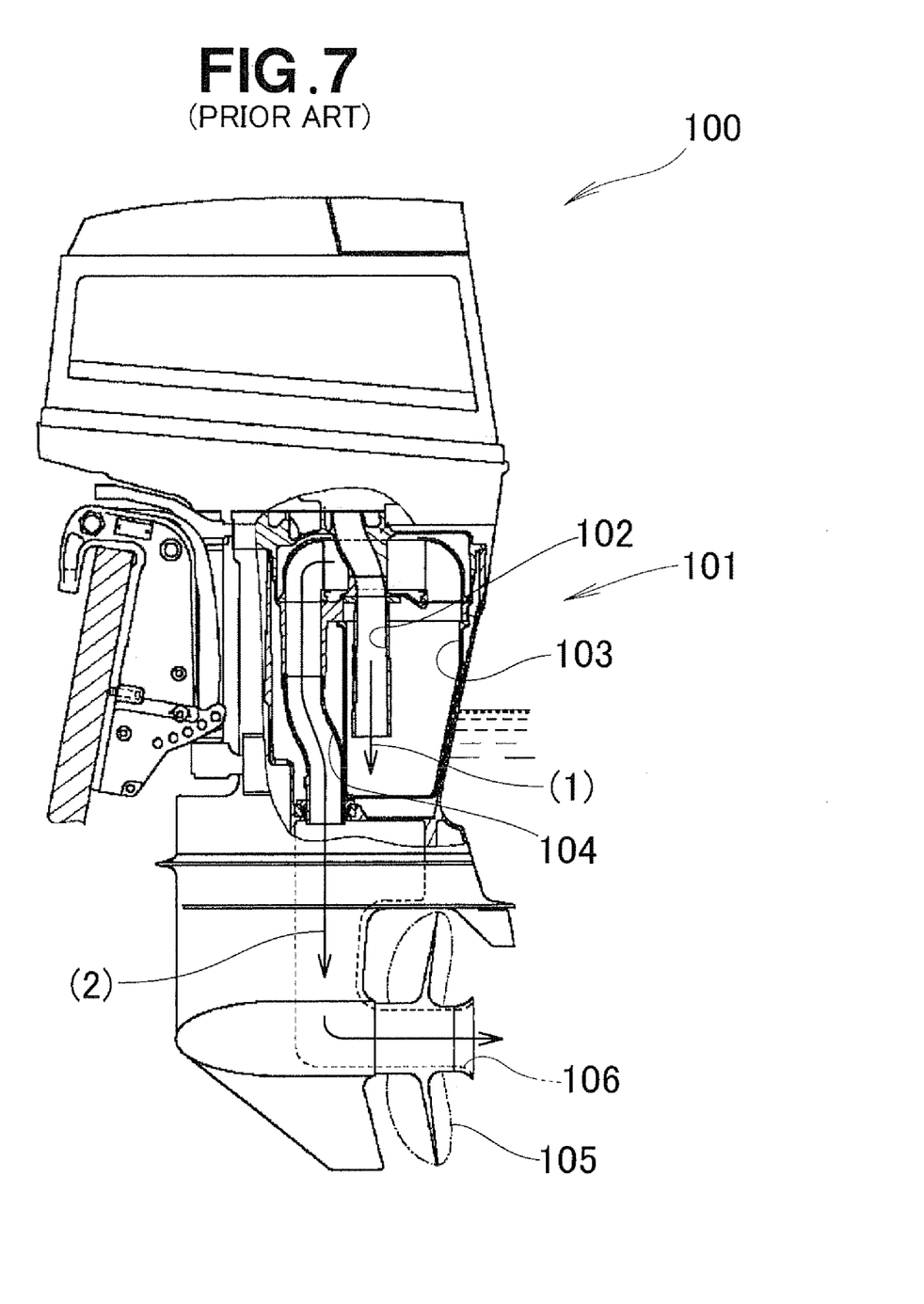
FIG. 7 is an overall side view explanatory of a conventionally-known outboard engine unit.

FIG. 7 is a view explanatory of the outboard engine unit 100 disclosed in JP H05-246389 A, which has an exhaust passage system 101 for discharging engine exhaust gas into the water (i.e., sea water, river water or the like). More specifically, in the disclosed outboard engine unit 100, exhaust gas from the engine passes through an engine-side exhaust pipe 102 as indicated by arrow (1) and is then directed into an exhaust expansion chamber 103. The exhaust gas is then directed from the exhaust expansion chamber 103 into a downstream exhaust pipe 104 to pass through the downstream exhaust pipe 104 as indicated by arrow (2) and is finally discharged through an exhaust port 106 of a propeller 105.

During operation of the engine, pressure within the exhaust passage system 101 would fluctuate due to variation in the number of rotations of the engine, so that the exhaust gas may flow back in the exhaust passage system 101. If the exhaust gas having water mist mixed therein flows back in the exhaust passage system 101, it may undesirably cause corrosion of metal component parts of the exhaust passage system 101.

Because the exhaust expansion chamber 103 is provided between the engine-side exhaust pipe 102 and the downstream exhaust pipe 104, the outboard engine unit 100 can prevent water from getting into an area which is located upstream of the engine-side exhaust pipe 102 and in which metal component parts are provided.

However, because of the provision of the exhaust expansion chamber 103 and a bent shape of the downstream exhaust pipe 104, the exhaust passage system 101 in the outboard engine unit 100 has a complicated construction and a large size.

SUMMARY OF THE INVENTION

In view of the foregoing prior art problems, it is an object of the present invention to provide an improved outboard engine unit which includes an exhaust passage system having a small size and simplified construction and yet can reliably prevent water from getting into an area upstream of an engine-side exhaust pipe.

In order to accomplish the above-mentioned object, the present invention provides an improved outboard engine unit having incorporated therein an exhaust passage system for discharging exhaust gas from an engine into water, the exhaust passage system comprising: an engine-side exhaust pipe provided adjacent to the engine; a downstream exhaust pipe provided downstream of the engine-side exhaust pipe for directing the exhaust gas downstream from the engine-side exhaust pipe, a lower end portion of the engine-side exhaust pipe and an upper end portion of the downstream exhaust pipe being positioned in parallel to each other in such a manner that the respective vertical central axes of the lower end portion and the upper end portion are offset from each other in a substantially horizontal direction of the unit, the lower end portion of the engine-side exhaust pipe and the upper end portion of the downstream exhaust pipe overlapping each other in the horizontal direction so as to provide fluid communication therebetween via a through-hole formed in overlapping portions of the end portions; and a vertical partition wall provided, in an upper end region of the overlapping portions of the end portions of the engine-side exhaust pipe and downstream exhaust pipe, for hampering back-flows of fluid into the engine-side exhaust pipe.

The partition wall provided for hampering back-flows of fluid (gas and water) can serve to separate water from exhaust gas having water mixed therein, and thus, the present invention can reliably prevent back-flows of water from entering an area upstream of the engine-side exhaust pipe, as a result of which it can prevent corrosion of metal component parts provided in the upstream area.

In addition, because the engine-side exhaust pipe and the downstream exhaust pipe only need to be arranged in such a manner that the lower end portion of the engine-side exhaust pipe and the upper end portion of the downstream exhaust pipe are positioned in horizontally parallel to each other and horizontally overlap each other, the exhaust passage system can have a simplified construction and a reduced size. Furthermore, because the overlapping portions of the end portions of the engine-side exhaust pipe and downstream exhaust pipe has a relatively large sectional shape so that the end portions of the engine-side exhaust pipe and downstream exhaust pipe together define a chamber-like structure, the outboard engine unit of the present invention can effectively lower a volume of sound produced by exhaust gas emission.

Preferably, the downstream exhaust pipe is closed at its upper end with a lid, and the downstream exhaust pipe is in fluid communication with an oil case, provided over the lid, via a through-hole formed in the lid. In case a large amount of water flows back in the exhaust passage system, some of the water is allowed to enter the chamber of the oil case via the through-hole formed in the lid, and thus, the exhaust passage system can be prevented from being blocked with the water. In addition, because pressure fluctuation occurring due to back-flows of fluid can be effectively absorbed by the through-hole formed in the lid, the present invention can avoid damage to the exhaust passage system.

Preferably, the engine-side exhaust pipe is closed at its lower end with a bottom plate slanting downward toward the downstream exhaust pipe. The slanting bottom plate allows exhaust gas from the engine to flow downstream or downward smoothly therealong, and thus, the present invention can reduce adverse influences on the output of the engine. In addition, the slanting bottom plate allows water to fall downstream therealong without staying in the engine-side exhaust pipe, and thus, the present invention can even more effectively prevent corrosion of the metal component parts.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

A preferred embodiment of the present invention will be described in detail below, by way of example only, with reference to the accompanying drawings, in which:

FIG. 5 is explanatory of behavior of the exhaust passage system, of which FIG. 5A is a sectional view explanatory of behavior of an exhaust passage system in a comparative (conventional) example of an outboard engine unit while

DETAILED DESCRIPTION OF THE PREFERRED EMBODIMENT

Figure 1:
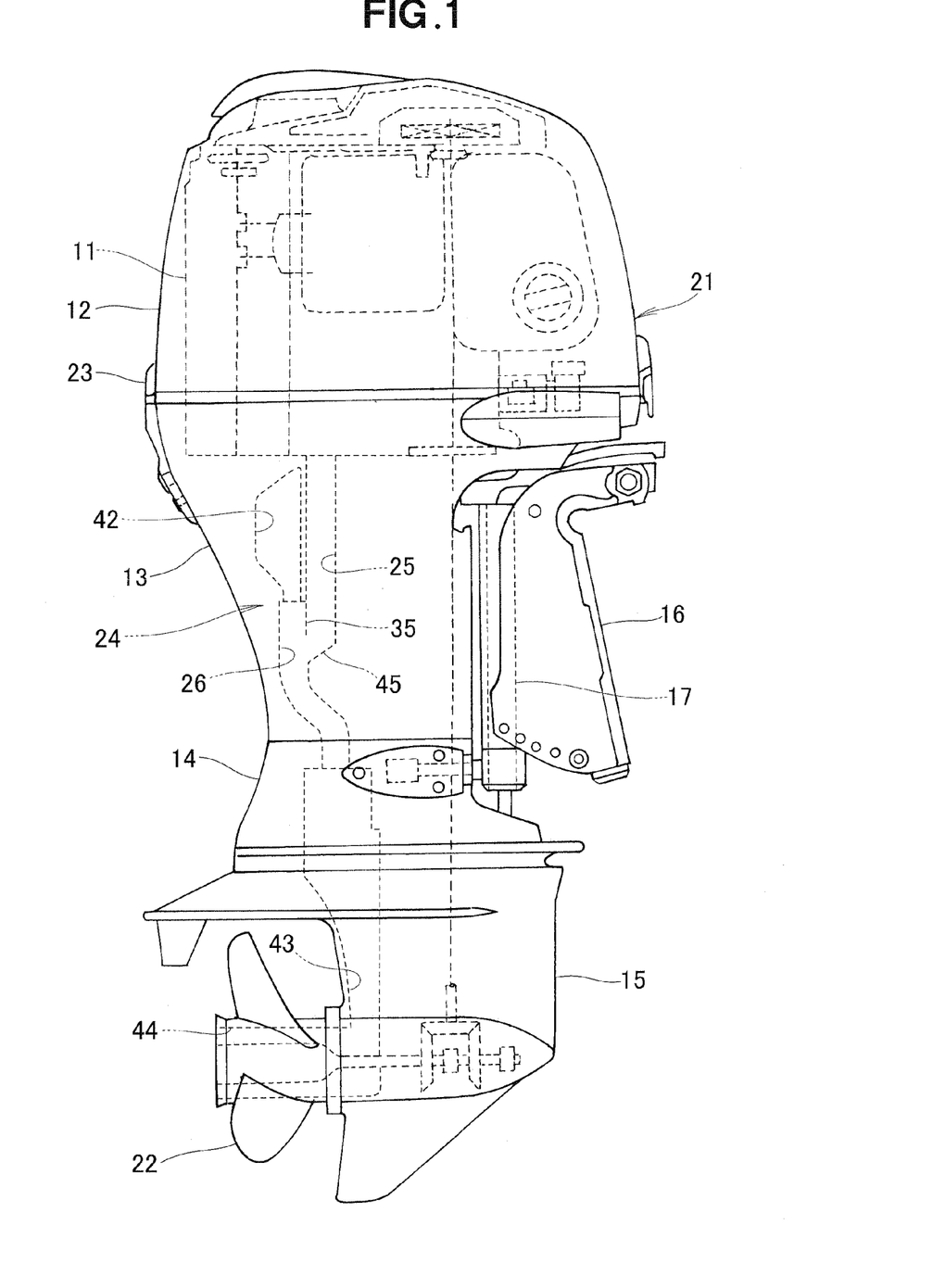
FIG. 1 is a side view showing an overall arrangement of an outboard engine unit according to an embodiment of the present invention.

Reference is now made to FIG. 1 showing, in side elevation, an overall arrangement of an outboard engine unit according to an embodiment of the present invention. As shown, the outboard engine unit 10 includes an engine 11 provided in an upper section of the unit 10. The engine 11 is a vertically placed engine with a cylinder and piton oriented horizontally and with a crankshaft and cam shaft oriented vertically. A direction in which a boat, having the outboard engine unit 10 mounted thereon, travels forward is a rightward direction in the figure.

The outboard engine unit 10 also includes: an upper engine cover 12 that covers an upper portion of the engine 11; a lower engine cover 13 disposed under the upper engine cover 12 to cover a lower portion of the engine 11; an extension case 14 disposed under the lower engine cover 13; and a gear case 15 disposed under the extension case 14.

The outboard engine unit 10 includes an outboard engine body 21 mounted via a vertical swivel shaft 17 to a stern bracket 16 that is in turn fixedly connected to a hull or body of the boat, and the engine body 21 is horizontally pivotable relative to the stern bracket 16 up to a predetermined maximum steered angle about the swivel shaft 17.

Behind the gear case 15 is disposed a propeller 22 rotatable by power produced by the engine 11 to provide propelling power. The propeller 22 is switchable between forward rotation and reverse rotation via a pair of dog clutches, to thereby provide forward or rearward propelling power.

The upper engine cover 12 is mounted to the lower engine cover 13 by means of a rear fastener 23 with a hook engaged with a front inner surface of the lower engine cover 13.

The outboard engine unit 10 also has an exhaust passage system 24 incorporated therein for discharging exhaust gas from the engine 11.

Figure 2:
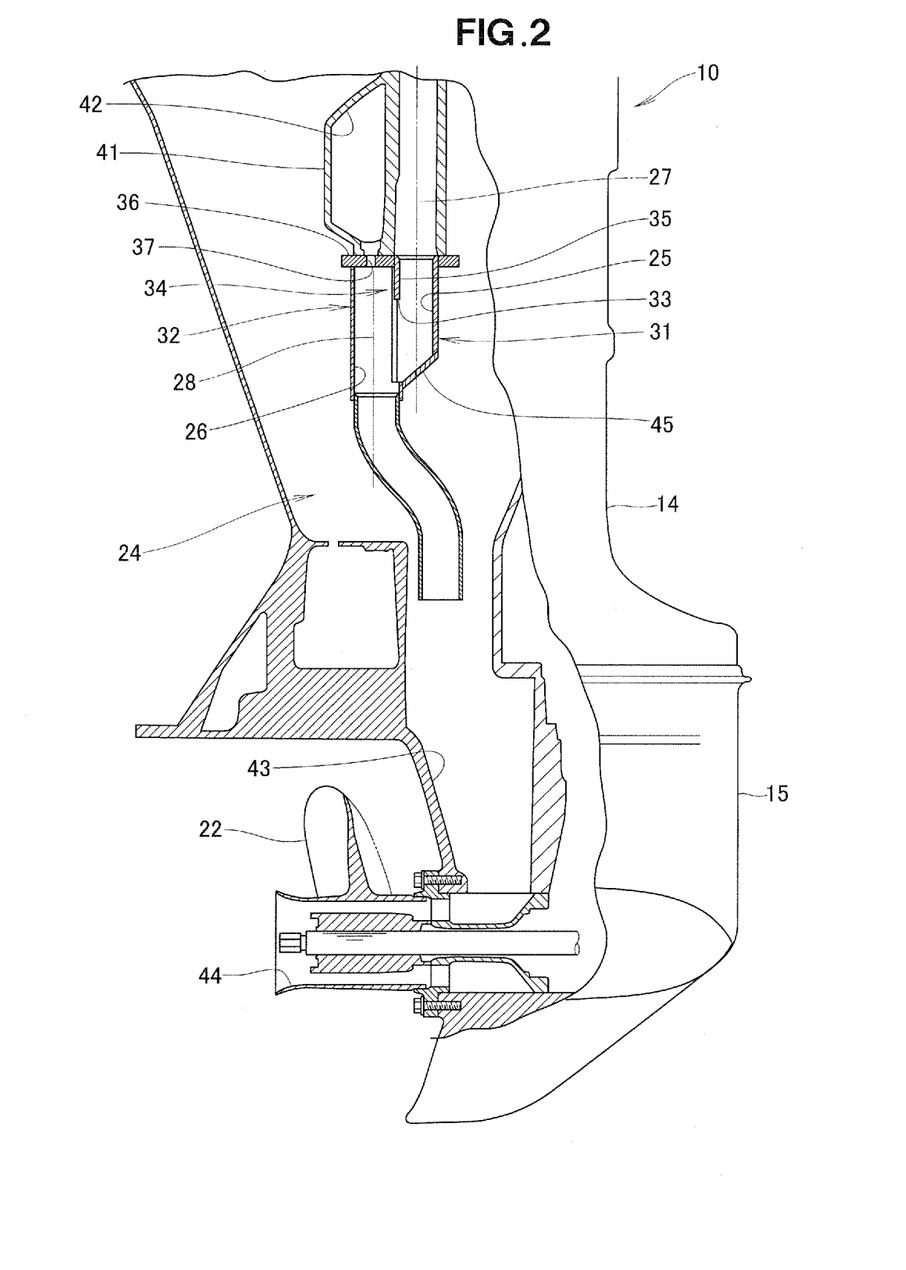
FIG. 2 is a schematic view showing, partly in section, an exhaust passage system employed in the outboard engine unit of FIG. 1.

FIG. 2 is a partly-sectional view of the exhaust passage system 24. As shown, the exhaust passage system 24 includes an engine-side (or upstream) exhaust pipe 25 located adjacent to the engine 11 (FIG. 1) and connected to an exhaust manifold (not shown) of the engine 11, and a downstream exhaust pipe 26 for directing the exhaust gas downstream from the engine-side exhaust pipe 25. A lower end portion 31 of the engine-side exhaust pipe 25 and an upper end portion 32 of the downstream exhaust pipe 26 are positioned parallel to each other in such a manner that the respective vertical central axes 27 and 28 are offset from each other in a substantially horizontal direction of the unit 10. Further, the lower end portion 31 of the engine-side exhaust pipe 25 and the upper end portion 32 of the downstream exhaust pipe 26 overlap each other horizontally so as to provide fluid communication therebetween via a through-hole 33 formed in overlapping portions of the end portions 31 and 32. A vertical partition wall 35 for hampering back-flows of fluid (i.e., exhaust gas and water) is provided in an upper end region 34 of the overlapping portions of the end portions 31 and 32.

The downstream exhaust pipe 26 is closed at its upper end with a lid 36, and the downstream exhaust pipe 26 and a chamber 42 of an oil case 41, provided immediate above the lid 36, are in fluid communication with each other via a through-hole 37 formed in the lid 36.

An exhaust guide path 43 is provided below the downstream exhaust pipe 26 and inside the extension case 14 and gear case 15. Further, an exhaust outlet port 44 for discharging the exhaust gas into the water is provided inside the propeller 22, and this exhaust outlet port 44 is in communication with the exhaust guide path 43.

Figure 3:
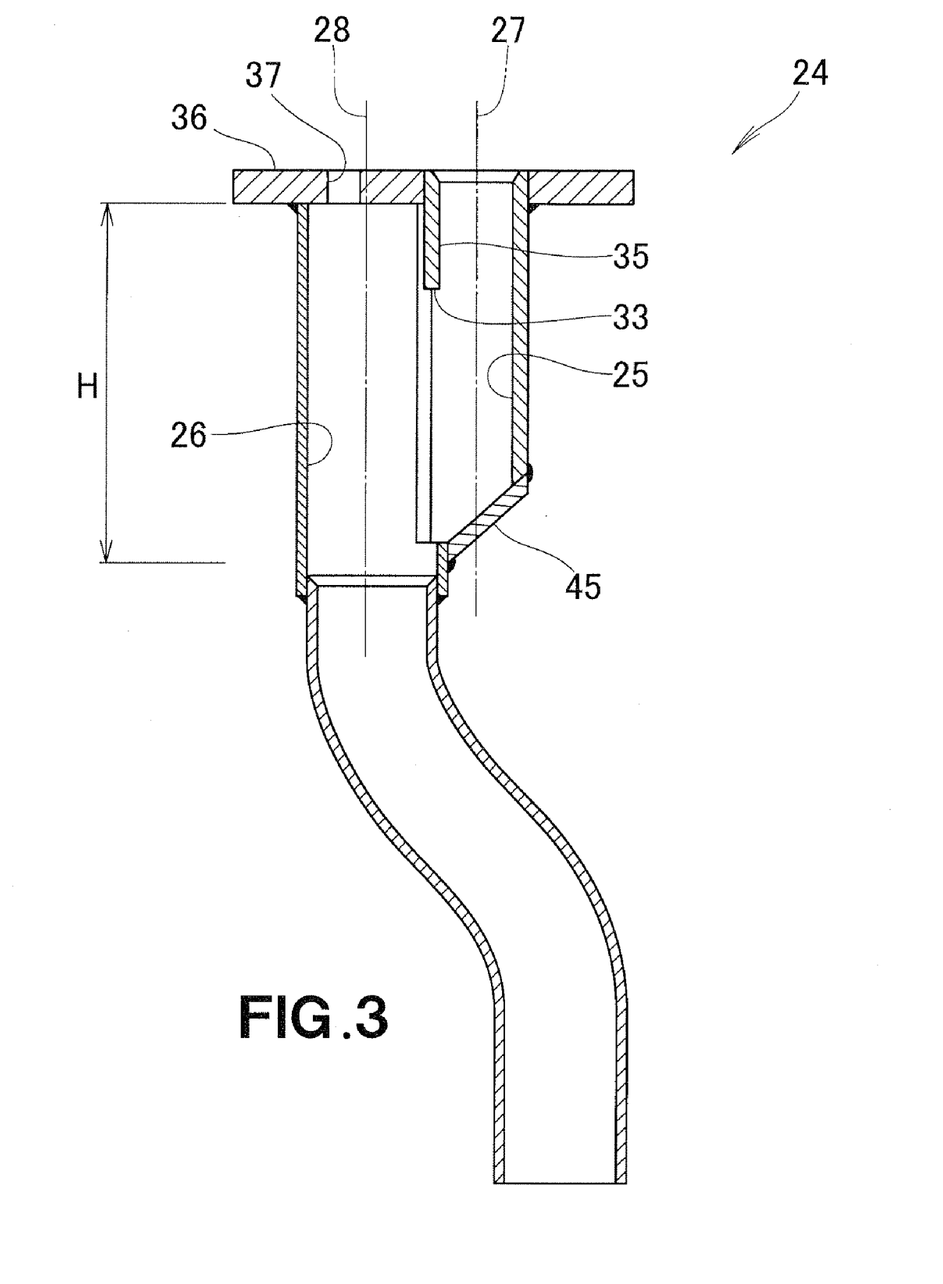
FIG. 3 is a sectional view showing primary sections of the exhaust passage system.

The following describe in more detail primary sections of the exhaust passage system 24, with reference to FIG. 3 that is a sectional view showing the primary sections of the exhaust passage system 24. As shown, the engine-side exhaust pipe 25 is closed at its lower end with a bottom plate 45 that slants downwardly toward the downstream exhaust pipe 26. The engine-side exhaust pipe 25 and the downstream exhaust pipe 26 are fixedly joined together by welding. The overlapping portions of the end portions 31 and 32 of the engine-side exhaust pipe 25 and downstream exhaust pipe 26 has a vertical length (or height) H, and the partition wall 35 has a length smaller than the vertical length H of the overlapping portions.

The overlapping portions of the end portions 31 and 32 of the engine-side exhaust pipe 25 and downstream exhaust pipe 26 has a relatively large sectional shape so that the end portions 31 and 32 of the engine-side exhaust pipe 25 and downstream exhaust pipe 26 together define a chamber-like structure, and thus, the outboard engine unit 10 of the present invention can effectively lower a volume of sound produced by exhaust gas emission.

Next, with reference to FIG. 4, a description will be given about behavior of the outboard engine unit 10 constructed in the aforementioned manner.

Figure 4:
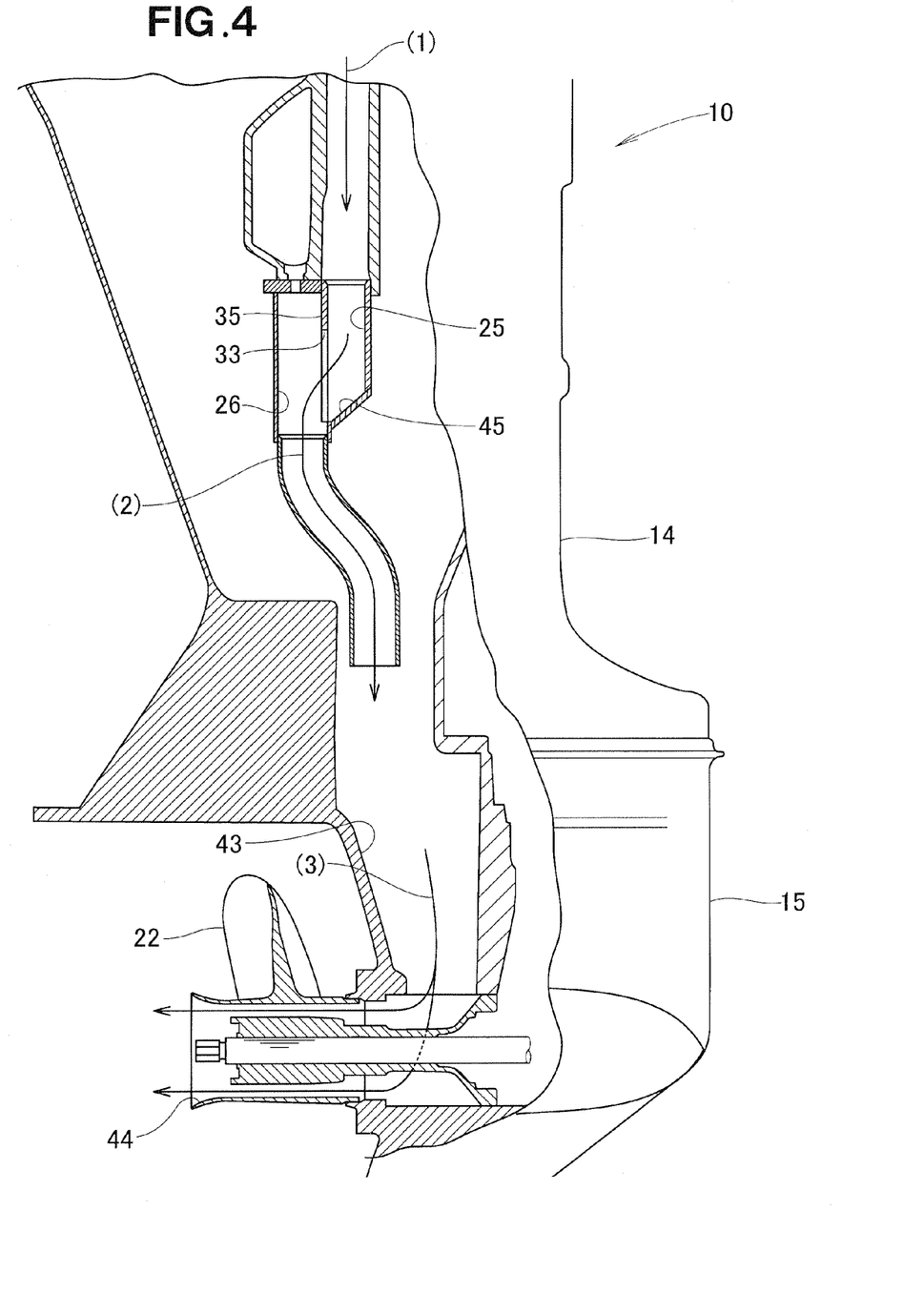
FIG. 4 is a sectional view explanatory of flows of exhaust gas to be discharged.

As shown in FIG. 4, exhaust gas from the engine 11 (FIG. 1) first enters the engine-side exhaust pipe 25 as indicated by arrow (1). Then, the exhaust gas flows through the exhaust pipe 25 smoothly while being guided along the slanting bottom plate 45, then enters the downstream exhaust pipe 26 via the through-hole 33, then flows through the downstream exhaust pipe 26 as indicated by arrow (2), and is then directed to the exhaust guide path 43. The exhaust gas having been directed to the guide path 43 is discharged through the exhaust outlet port 44 into the water as indicated by arrow (3).

The following describe behavior of the embodiment of the outboard engine unit 10 when water flows back in the exhaust passage system 24.

Figure 5A:
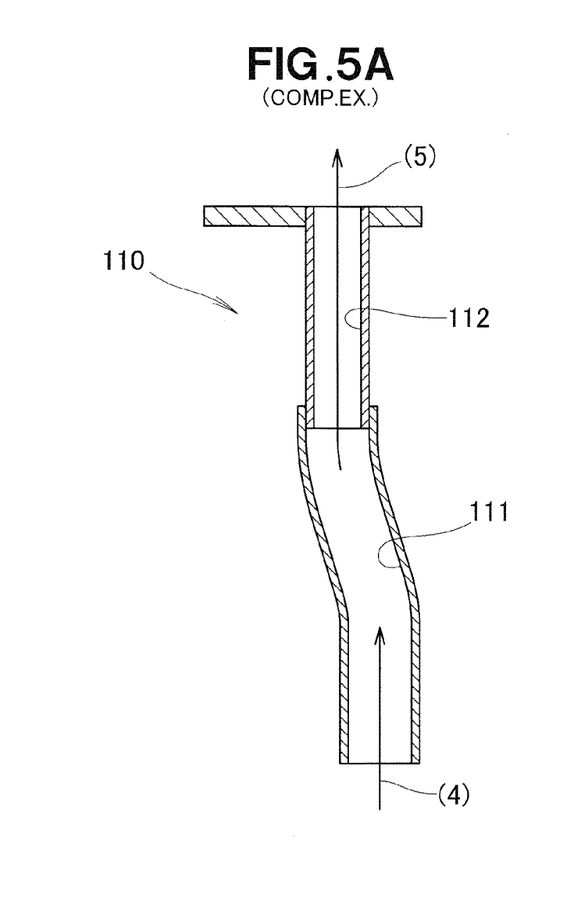

FIG. 5A is a sectional view explanatory of behavior of an exhaust passage system in a comparative (conventional) example of an outboard engine unit. The comparative example includes an exhaust passage system 110 that includes a downstream exhaust pipe 111 and an engine-side (or upstream) exhaust pipe 112. Water having flown back from a downstream of the exhaust passage system 110 enters the downstream exhaust pipe 111 as indicated by arrow (4). Because flows of the water having entered the downstream exhaust pipe 111 are not substantively hampered, it enters the engine-side exhaust pipe 112 to proceed further upstream as indicated by arrow (5). As a consequence, metal component parts provided in an area upstream of the engine-side exhaust pipe 112 can be easily corroded.

Figure 5B:
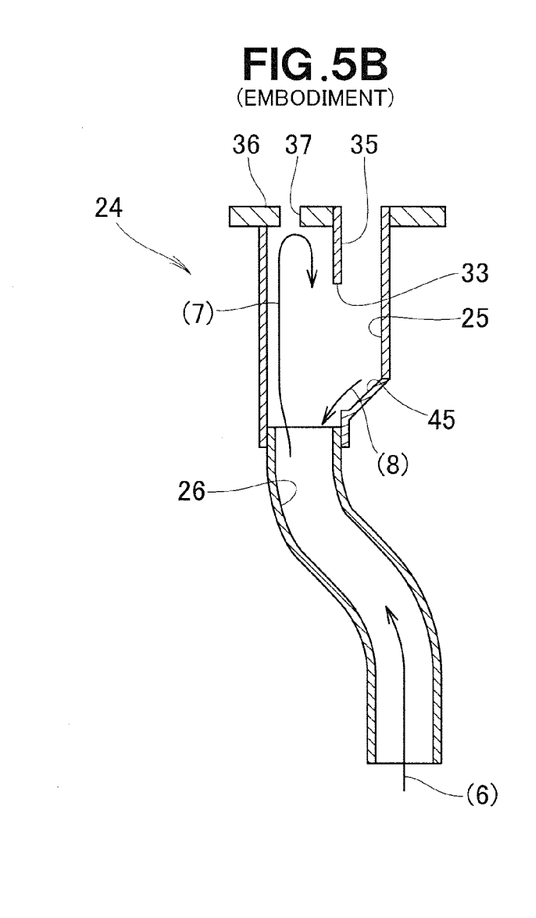
FIG. 5B is a sectional view explanatory of behavior of the exhaust passage system in the embodiment of the present invention.

FIG. 5B is a sectional view explanatory of behavior of the exhaust passage system 24 in the embodiment of the present invention. Water having flown back from a downstream area of the exhaust passage system 24 enters the downstream exhaust pipe 26 as indicated by arrow (6). The water, having entered the downstream exhaust pipe 26, flows upward in the downstream exhaust pipe 26 without being hampered and hits the lid 36 and partition wall 35 to flow downward as indicated by arrow (7). Namely, because the water, having entered the downstream exhaust pipe 26 from the downstream area, is hampered by the partition wall 35, it does not enter the engine-side pipe 25. In this way, the embodiment can reliably prevent corrosion of metal component parts provided in an area upstream of the engine-side exhaust pipe 25.

Whereas the behavior of the embodiment of the present invention has been shown and described in relation to the case where water flows back in the exhaust passage system 24, the embodiment of the present invention can behave in a similar manner to the aforementioned when exhaust gas having water mist mixed therein flows back in the exhaust passage system. In this case, the partition wall 35 serves to separate the water from the exhaust gas.

Further, when exhaust gas is to be discharged from the engine 11, it is sent from the upstream area into the engine-side pipe 25, where it can smoothly flow downstream or downward as indicated by arrow (8) while being guided along the slanting bottom plate 45 of the engine-side pipe 25. Note that water too, if any, can reliably flow downstream along the slanting bottom plate 45 without staying in the engine-side pipe 25.

Figure 6:
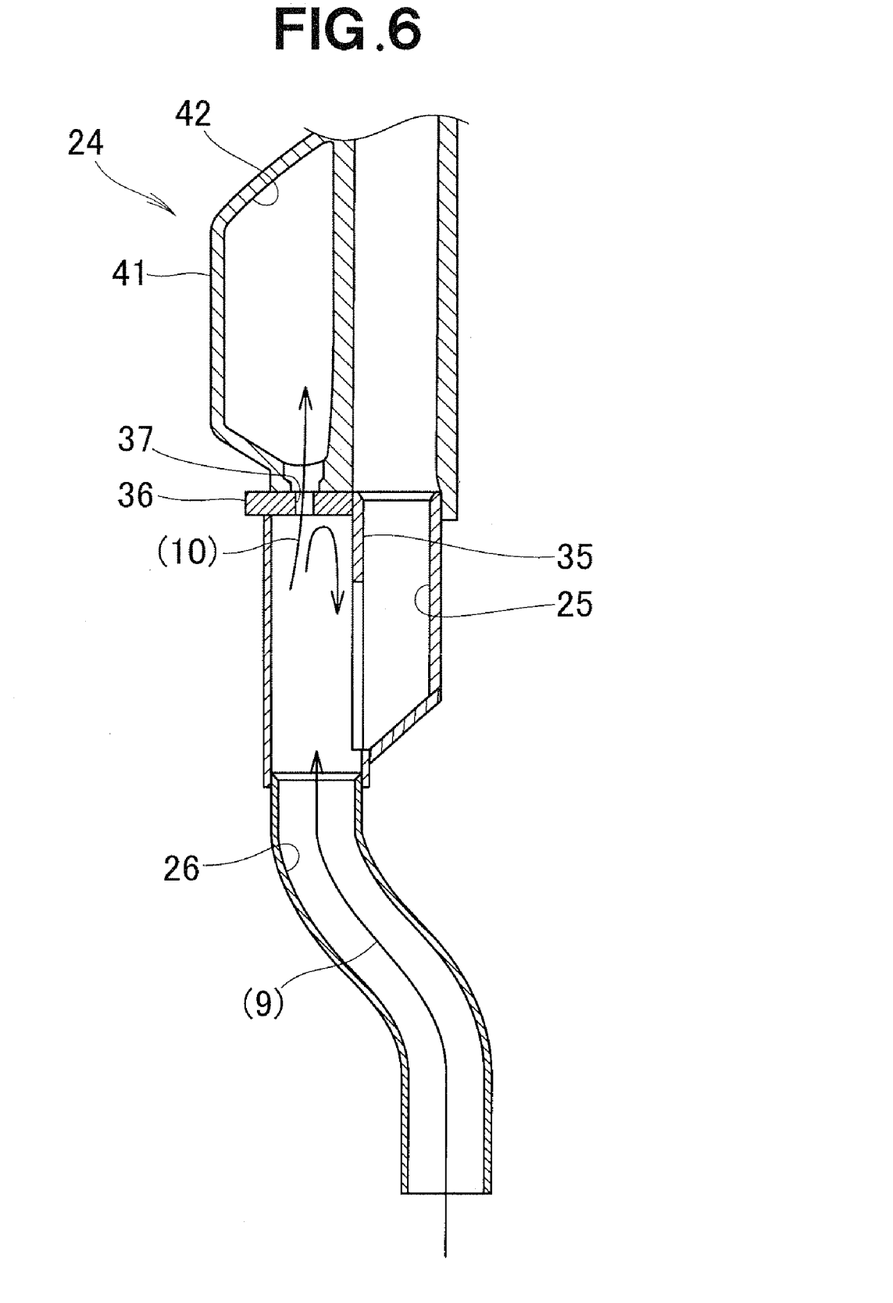
FIG. 6 is a sectional view explanatory of behavior of a through-hole formed in a lid closing the upper end of a downstream exhaust pipe employed in the exhaust passage system.

The above-mentioned through-hole 37 formed in the lid 36 operates as follows. As shown in FIG. 6, in case a large amount of water flows back from a downstream area in the exhaust passage system 24, it enters the downstream exhaust pipe 26 as indicated by arrow (9). Then, if the water flows further upward in the downstream exhaust pipe 26, it hits the lid 36 and partition wall 35, so that most of the water is returned downward via the lid 36 and partition wall 35. However, some of the water, which could not be returned downward via the lid 36 and partition wall 35, may flow further upward through the through-hole 37 of the lid 36 into the chamber 42 of the oil case 41 as indicated by arrow (10).

As a consequence, it is possible to suppress, to a considerable degree, pressure fluctuation within the exhaust passage system 24 and prevent damage to the exhaust passage system 24. Note that the outboard engine unit 10 can similarly prevent damage to the exhaust passage system 24 not only when water flows back in the exhaust passage system 24 but also when exhaust gas flows back in the exhaust passage system 24.

Whereas the outboard engine unit of the present invention has been described in relation to the case where exhaust gas from the engine 11 is discharged through the exhaust outlet port 44 provided in the propeller 22, it may be constructed in such a manner that exhaust gas from the engine 11 is discharged through an exhaust outlet port provided in the gear case 15.

The present invention is well suited for application to outboard engine units having incorporated therein an exhaust passage system for discharging exhaust gas from an engine to the water.

What is claimed is:

1. An outboard engine unit having incorporated therein an exhaust passage system for discharging exhaust gas from an engine into water, the exhaust passage system comprising:
an engine-side exhaust pipe provided adjacent to the engine;
a downstream exhaust pipe provided downstream of the engine-side exhaust pipe for directing the exhaust gas downstream from the engine-side exhaust pipe, a lower end portion of the engine-side exhaust pipe and an upper end portion of the downstream exhaust pipe being positioned in parallel to each other in such a manner that respective vertical central axes of the lower end portion and the upper end portion are offset from each other in a substantially horizontal direction of the unit, the lower end portion of the engine-side exhaust pipe and the upper end portion of the downstream exhaust pipe overlapping each other in the horizontal direction so as to provide fluid communication therebetween via a through-hole formed in overlapping portions of the end portions; and
a vertical partition wall provided, in an upper end region of the overlapping portions of the end portions of the engine-side exhaust pipe and the downstream exhaust pipe, for hampering back-flows of fluid into the engine-side exhaust pipe.

2. The outboard engine unit of claim 1, wherein the downstream exhaust pipe is closed at an upper end thereof with a lid, and the downstream exhaust pipe is in fluid communication with an oil case, provided over the lid, via a through-hole formed in the lid.

3. The outboard engine unit of claim 1, wherein the engine-side exhaust pipe is closed at a lower end thereof with a bottom plate slanting downward toward the downstream exhaust pipe.

* * * * *